United States Patent Office 3,021,370
Patented Feb. 13, 1962

3,021,370
POLYUNSATURATED SULFIDES AND SULFONES
AND METHOD OF PREPARING SAME
Henry Bluestone, University Heights, Ohio, assignor to Diamond Alkali Company, Cleveland, Ohio, a corporation of Delaware
No Drawing. Filed Oct. 6, 1958, Ser. No. 765,330
18 Claims. (Cl. 260—607)

The present invention relates to aliphatic sulphur derivatives of haloalkylpolyenes and to their application and preparation.

These biologically-active and specifically fungicidally-active compositions comprise novel sulfur compounds which may be represented by the structure:

(I)
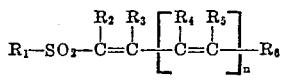

wherein $n$ is a number from 1 to 3, inclusive, $R_1$ is selected from the group consisting of alkyl radicals, e.g., methyl, ethyl, propyl, isopropyl, butyl, octyl, decyl, and their isomers, aryl radicals, e.g., phenyl and naphthyl radicals, alkaryl radicals, e.g., tolyl and xylyl radicals, aralkyl radicals, e.g., benzyl and phenethyl radicals, preferably those alkyl and aryl radicals having from 1 to 15 carbon atoms, inclusive, including the hydroxy, nitro, halo, and alkoxy derivatives of these radicals, such as chloro, fluoro, iodo, bromo, methoxy, ethoxy, propoxy and butoxy derivatives; $R_2$, $R_3$, $R_4$, $R_5$ and $R_6$ are selected from the group consisting of hydrogen atoms, halogen atoms, preferably chlorine atoms, sulfonyl radicals of the structure

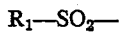

sulfinyl radicals of the structure $R_1$—SO—, and mercapto radicals of the structure $R_1$—S—, wherein $R_1$ is as previously defined.

More specifically, a preferre embodiment of the present invention comprises halobutadiene, e.g., chloroprene and hexachlorobutadiene, derivatives which may be represented by the structure:

(II)
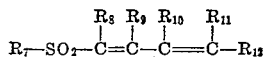

wherein $R_7$ is selected from the group consisting of alkyl, aryl, alkaryl, and aralkyl radicals, including the hydroxy, nitro, halo, and alkoxy derivatives of these radicals; $R_8$, $R_9$, $R_{10}$, $R_{11}$ and $R_{12}$ are selected from the group consisting of hydrogen atoms, halogen atoms, nitroalkylthio, alkoxyalkylthio, hydroxyalkylthio, haloalkylthio, nitroarylthio, alkoxyarylthio, hydroxyarylthio, haloarylthio, nitroalkylsulfonyl, alkoxyalkylsulfonyl, hydroxyalkylsulfonyl, haloalkylsulfonyl, nitroarylsulfonyl, alkoxyarylsulfonyl, hydroxyarylsulfonyl, and haloarylsulfonyl radicals.

Specific examples of each of the groups which $R_8$—$R_{12}$ may be are:

Nitroalkylthio radicals, e.g., 2-nitroethylthio, 2-nitro-n-butylthio, 2-nitroisopropylthio.
Alkoxyalkylthio radicals, e.g., 2-ethoxyethylthio, 2-methoxyethylthio, 2-ethoxy-n-propylthio.
Hydroxyalkylthio radicals, e.g., 2-hydroxyethylthio, 2-hydroxy-n-propylthio, 2-hydroxy-n-heptylthio.
Haloalkylthio radicals, e.g., 2-chloroethylthio, 2-chloro-n-propylthio, 2-chloro-n-heptylthio.
Nitroarylthio radicals, e.g., 4-nitrophenylthio, 2,4-dinitrophenylthio, 2,4,6-trinitrophenylthio.
Alkoxyarylthio radicals, e.g., 4-methoxyphenylthio, 2,4-dimethoxyphenylthio, 4-isopropoxyphenylthio.
Hydroxyarylthio radicals, e.g., 4-hydroxyphenylthio, 5-hydroxynaphthylthio.
Haloarylthio radicals, e.g., 4-chlorophenylthio, 2,4-dichlorophenylthio, 2,4,5-trichlorophenylthio.

Nitroalkylsulfonyl radicals, e.g., 2-nitroethylsulfonyl, 2-nitro-n-butylsulfonyl, 2-nitroisopropylsulfonyl.
Alkoxyalkylsulfonyl radicals, e.g., 2-ethoxyethylsulfonyl, 2-methoxyethylsulfonyl, 2-ethoxy-n-propylsulfonyl.
Hydroxyalkylsulfonyl radicals, e.g., 2-hydroxyethylsulfonyl, 2-hydroxy-n-propylsulfonyl, 2-hydroxy-n-heptylsulfonyl.
Haloalkylsulfonyl radicals, e.g., 2-chloroethylsulfonyl, 2-chloro-n-propylsulfonyl, 2-chloro-n-heptylsulfonyl.
Nitroarylsulfonyl radicals, e.g., 4-nitrophenylsulfonyl, 2,4-dinitrophenylsulfonyl, 2,4,6-trinitrophenylsulfonyl.
Alkoxyarylsulfonyl radicals, e.g., 4-methoxyphenylsulfonyl, 2,4-dimethoxyphenylsulfonyl, 4-isopropoxyphenylsulfonyl.
Hydroxyarylsulfonyl radicals, e.g., 4-hydroxyphenylsulfonyl, 5-hydroxynaphthylsulfonyl.
Haloarylsulfonyl radicals, e.g., 4-chlorophenylsulfonyl, 2,4-dichlorophenylsulfonyl, 2,4,5-trichlorophenylsulfonyl.

It is intended that as used in the specification and claims the term "sulfone compound," i.e., those compounds having the radical $R_1$—$SO_2$—, wherein $R_1$ is as defined, also includes the sulfoxide having the radical $R_1$—SO—, wherein $R_1$ is as previously defined. Illustrative sulfoxide compounds of this type are:

2-(pentachlorobutadienylsulfinyl)ethanol
Dichloro-tetrakis(methylsulfinyl)-butadiene
Methyl pentachlorobutadienyl sulfoxide
Trichloro-tris(methylsulfinyl)-butadiene
Tetrachloro-bis(methylsulfinyl)-butadiene
2-chloroethyl pentachlorobutadienyl sulfoxide Specific illustrative sulfone compounds within the scope of generic structure I above are:

Methyl heptachlorohexatrienyl sulfone
Hexachloro-bis(methylsulfonyl)-hexatriene
2-chloroethyl heptachlorohexatrienyl sulfone
Hexachloro-bis(2-chloroethylsulfonyl)-hexatriene
Isopropyl heptachlorohexatrienyl sulfone
n-Butyl heptachlorohexatrienyl sulfone
Bromoethyltetrachlorobutadienyl sulfone
Hexachloro-bis(2-nitroethylsulfonyl)-hexatriene
Hexachloro-bis(2-ethoxyethylsulfonyl)-hexatriene Other illustrative specific examples are derivatives of hexachlorobutadiene, such as:

Methyl pentachlorobutadienyl sulfone
Tetrachloro-bis(methylsulfonyl)-butadiene
Trichloro-tris(methylsulfonyl)-butadiene
Dichloro-tetrakis(methylsulfonyl)-butadiene
2-(pentachlorobutadienylsulfonyl)ethanol
2-chloroethyl pentachlorobutadienyl sulfone
Ethyl pentachlorobutadienyl sulfone
Isopropyl pentachlorobutadienyl sulfone
Tetrachloro-2-chloroethylsulfinyl-2-chloroethylsulfonyl-butadiene
Ethoxyethyl pentachlorobutadienyl sulfone
Nitroethyl pentachlorobutadienyl sulfone
Phenylpentachlorobutadienyl sulfone
Chlorophenyl pentachlorobutadienyl sulfone
Tetrachloro-bis(isopropylsulfonyl)-butadiene
Phenyl pentachlorobutadienyl sulfone
4-tolyl pentachlorobutadienyl sulfone
4-chlorophenyl pentachlorobutadienyl sulfone
2,4-dichlorophenyl pentachlorobutadienyl sulfone
4-nitrophenyl pentachlorobutadienyl sulfone
Benzyl pentachlorobutadienyl sulfone
4-hydroxyphenyl pentachlorobutadienyl sulfone
Diphenyl tetrachlorobutadienyl sulfone
Bis(4-chlorophenyl)butadienyl sulfone
Bis(2,4-dibromophenyl)butadienyl sulfone
Bis(4-nitrophenyl)butadienyl sulfone Further preferred compounds of the present invention are the novel starting materials used in the preparation of compounds within the scope of generic structure I above. These thio starting materials, having at least two ethylenic bonds, may be represented by the structure:

(III)      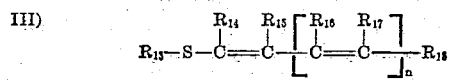

wherein $n$ is a number from 1 to 3, inclusive, e.g., 1 to 2; $R_{13}$ is selected from the group consisting of alkyl, aryl, alkaryl, and aralkyl radicals and hydroxy, nitro, halo, and alkoxy derivatives of these radicals; $R_{14}$, $R_{15}$, $R_{16}$, $R_{17}$ and $R_{18}$ are selected from the group consisting of hydrogen atoms, halogen atoms, alkylthio, alkylsulfinyl, and alkylsulfonyl radicals, which radicals are as defined under structure I.

Preferred illustrative compounds within structure III above may be represented by the structure:

(IV)      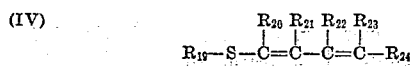

wherein $R_{19}$ is selected from the group consisting of alkyl, aryl, aralkyl, and alkaryl radicals, including the hydroxy, nitro, halo, and alkoxy derivatives of these radicals, which radicals are as defined under structure I. $R_{20}$, $R_{21}$, $R_{22}$, $R_{23}$ and $R_{24}$ are selected from the group consisting of hydrogen atoms, halogen atoms, nitroalkylthio, alkoxyalkylthio, hydroxyalkylthio, haloalkylthio, nitroarylthio, alkoxyarylthio, hydroxyarylthio, haloarylthio, nitroalkylsulfonyl, alkoxyarylsulfonyl, hydroxyarylsulfonyl, and haloarylsulfonyl radicals. Preferred compounds of this type are those within the scope of structure IV above wherein $R_{24}$ is an alkylthio or haloalkylthio radical.

Specific illustrative compounds within the scope of structure III above are:

Methyl pentachlorobutadienyl sulfide
Tetrachloro-bis(methylthio)-butadiene
2-hydroxyethyl pentachlorobutadienyl sulfide
2-chloroethyl pentachlorobutadienyl sulfide
Isopropyl pentachlorobutadienyl sulfide
Tetrachloro-bis(isopropylthio)-butadiene
Tetrachloro-bis(2-hydroxyethylthio)-butadiene
Ethyl pentachlorobutadienyl sulfide
Hexachloro-bis(methylthio)-hexatriene
Hexachloro-bis(ethylthio)-hexatriene
2-nitroethyl pentachlorobutadienyl sulfide
Ethoxybutyl pentachlorobutadienyl sulfide
Phenyl pentachlorobutadienyl sulfide
4-tolyl pentachlorobutadienyl sulfide
4-chlorophenyl pentachlorobutadienyl sulfide
2,4-dichlorophenyl pentachlorobutadienyl sulfide
4-nitrophenyl pentachlorobutadienyl sulfide
Benzyl pentachlorobutadienyl sulfide
4-hydroxyphenyl pentachlorobutadienyl sulfide
Diphenyl tetrachlorobutadienyl sulfide
Bis(4-chlorophenyl)butadienyl sulfide
Bis(2,4-dibromophenyl)butadienyl sulfide
Bis(4-nitrophenyl)butadienyl sulfide Compounds of generic structure III above may be prepared by chemically reacting a halopolyene, e.g., hexachlorobutadiene, or octachlorohexatriene, with a mercaptan $R_1$—SH, wherein $R_1$ is as previously defined, in the presence of a basic agent. Suitable basic agents are aqueous or non-aqueous solutions, e.g., those employing benzene, toluene, ethanol, methanol, isopropanol, dioxane, diethylether, and tetrahydrofuran, of an alkali metal hydroxide, such as sodium hydroxide or potassium hydroxide, alkali metal carbonates, such as sodium carbonate or potassium carbonate, and alkaline earth metal oxides, such as calcium oxide or barium oxide. Alkali metal as employed in the specification and claims is intended to refer to the monovalent metallic elements of the periodic system, i.e., lithium, sodium, potassium, rubidium and cesium; and accordingly, alkaline earth is intended to refer to the divalent metallic elements of the second group in the periodic system comprising calcium, barium and strontium. Reactants are typically mixed in essentially stoichiometric amounts; however, considerable deviation from these proportions may be tolerated without serious detriment to either yield or purity of product. Specifically, 1 mole of the halopolyene, e.g., hexachlorobutadiene, containing X-halogen atoms may be combined with 1 to X moles of the appropriate mercaptan in the presence of an equivalent amount of basic agent, X being a number from 1 to 8, inclusive. Typically, an excess, e.g., 5 to 15% molar excess of the mercaptan and basic agent are employed.

The reactants are generally combined at a temperature between about —20° C. and the reflux temperature of the reaction mixture, e.g., 0° to 150° C.; however, preferably the reactants are combined at the temperature of a refluxing solvent, e.g., 75° to 85° C. Suitable solvents which may be employed to facilitate the reaction are water or organic solvents such as alcohols, e.g., ethyl and isopropyl alcohols, hydrocarbons, such as benzene, toluene, xylene and petroleum ether, ethers such as dioxane, diethyl ether and tetrahydrofuran. The reaction is typically carried to completion requiring normally greater than ¼ hour, typically about ½ to 100 hours. The reaction generally is carried out at atmospheric pressure and results in typical yields of about 20 to 80% of the theoretical amount of pure product. The pure product may be isolated through means common in the art such as distillation, generally at reduced pressure, or recrystallization from an appropriate organic solvent.

More specifically, compounds within the scope of generic structure IV above may be prepared by chemically reacting a halobutadiene such as hexachlorobutadiene with a mercaptan as previously defined. Illustrative mercaptans suitable for this application are ethyl mercaptan, n-butyl mercaptan, t-butyl mercaptan, methyl mercaptan, isopropyl mercaptan, 2-hydroxyethyl mercaptan, 2-chloro-n-propyl mercaptan, 2-chloroisopropyl mercaptan, 2-nitro-n-propyl mercaptan, 2-ethoxy-n-propyl mercaptan and thiophenol. The reactants are typically combined in the presence of a basic agent such as sodium, alkali metal hydroxide, e.g., sodium hydroxide, potassium hydroxide or an alkali metal carbonate, as previously defined, in essentially stoichiometric ratios; e.g., about 1 mole of hexachlorobutadiene is combined with about 1 to 6 moles of the mercaptan in the presence of an equivalent amount of the basic agent, i.e., 1 to 6 moles of sodium, sodium hydroxide or potassium hydroxide. Typically about 5 to 15% molar excess of the mercaptan and basic agent are employed to accelerate the reaction.

This reaction may or may not be carried out in the presence of a solvent; however, typical solvents employed are water or an organic solvent, e.g., an alcohol such as ethanol, isopropanol, hydrocarbons such as toluene, xylene, benzene, ethers such as dioxane, diethyl and dimethyl ethers, and tetrahydrofuran. Other reaction variables such as temperature at which the reactants are combined, the length of time of reaction, and means of isolation are essentially the same as those taught in the previous generic combination of a mercaptan with a halopolyene. Although hexachlorobutadiene is the preferred halopolyene in this preparation, it is to be understood that other halopolyenes and specifically chloropolyenes such as pentachlorohexatriene may be employed.

Table I illustrates specific chlorobutadiene-alkylmercaptan reactions. In each case, 1 mole of hexachlorobutadiene is reacted with the alkylmercaptan listed in column 1 by refluxing in the amount of solvent listed in column 3 for a period of about 15 hours. The product is isolated by cooling, filtering and washing the filter cake with ethanol, separating the product from the ethanol solvent by stripping off the solvent and distilling the product at reduced pressure. Each column lists the specific quantity of mercaptan, basic agent and solvent employed.

TABLE I

*Hexachlorobutadiene derivatives*

| Alkyl Mercaptan | Basic Agent | Solvent Employed |
| --- | --- | --- |
| 2.2 moles ethyl mercaptan | 2.2 moles potassium hydroxide. | 2 liters of ethanol. |
| 2.2 moles isopropyl mercaptan | ----- do ----- | 2 liters of isopropanol. |
| 2.2 moles n-butyl mercaptan | ----- do ----- | 2 liters of ethanol. |
| 3.1 moles ethyl mercaptan | 3.1 moles sodium hydroxide. | Do. |
| 4.1 moles ethyl mercaptan | 4.1 moles potassium hydroxide. | Do. |
| 2.2 moles n-octyl mercaptan | 2.2 moles potassium hydroxide. | Do. |

Compounds within the scope of generic structure I may be prepared by chemically reacting a sulfide within the scope of generic structure III with an oxidizing agent. Suitable oxidizing agents in this application are hydrogen peroxide, potassium permanganate, potassium dichromate, chromic acid and organic per acids such as performic acid, peracetic acid, and perbenzoic acid. This oxidation may be carried out either after isolation of the pure sulfide from its initial reaction mixture or by oxidation of the crude reaction product. The sulfide and oxidizing agent are mixed typically in about stoichiometric amounts, employing ordinarily about 10 to 20% molar excess of the oxidizing agent to facilitate reaction. When hydrogen peroxide is employed as an oxidizing agent normally an aqueous solution comprising about 30 to 50% by weight hydrogen peroxide is employed. The reaction is typically carried to completion occurring normally in a period of greater than about ¼ hour, e.g., ¼ to 150 hours, typically in a period of less than 72 hours at a temperature of about −20° to 150° C., e.g., at a temperature of 20° to 40° C.

A solvent is normally used to facilitate the oxidation, suitable solvents for the peroxidic oxidation being carboxylic acids, such as formic and acetic acids; alcohols, such as methanol, ethanol, propanol, isopropanol; hydrocarbons, such as toluene, benzene, and xylene; ethers, such as diethyl and dimethyl ethers, dioxane and chlorinated hydrocarbons, such as dichloroethylene, trichloroethylene, tetrachloroethylene, trichlorobenzene, carbon tetrachloride and the like. The resultant sulfoxides and sulfones are solid and may be purified through recrystallization from an organic solvent, typically acetic acid or an acetic acid-alcohol mixture, such as acetic acid and ethanol or acetic acid and isopropanol.

Compounds within the scope of generic structure II above may be prepared by chemically reacting a compound of structure IV above with an oxidizing agent. This oxidation is carried out under reaction conditions and employing oxidizing agents essentially the same as that taught in the broad oxidation step, i.e., the preparation of a compound of generic structure I. More specifically, the reaction is typically carried to completion at a temperature of −20° to 90° C., e.g., a period of about ¼ to 100 hours at 0° to 80° C. A solvent is generally employed to facilitate reaction, the preferred solvent being acetic acid. The reactants are typically combined in essentially stoichiometric amounts and the resultant sulfoxide and sulfone may be purified by recrystallization from an organic solvent, such as an acetic acid-water mixture or an alcohol water mixture. Specific illustrative alkylmercapto polyene compounds which may be oxidized to the respective sulfone under the above reaction conditions are given as specific examples under generic structure IV above.

Table II illustrates specific hexachlorobutadiene derivatives within the scope of structure I which may be prepared by chemically reacting the respective amount of mercapto compound listed in column 1 with the oxidizing agent listed in column 2 in the presence of the amount of solvent given in column 3. The reactants are combined under essentially the same reaction conditions given for the oxidation of a compound of structure III, i.e., the temperature, solvent employed, time of reaction, and method of isolation are essentially the same. In each case, the reaction mixture is stirred at a temperature below about 50° C. until all the oxidizing agent is added and then heated slowly to about 80° C. until reaction completion. The resultant product is isolated by separating the product from the water-acid mixture by removing the solvent at reduced pressure followed by cooling and filtering the resultant crystalline product from the residue.

TABLE II

*Hexachlorobutadiene derivatives*

| Sulfide | Oxidizing Agent | Solvent |
| --- | --- | --- |
| 1 mole ethyl pentachlorobutadienyl sulfide. | 2.2 moles hydrogen peroxide. | 2 liters acetic acid. |
| 1 mole tetrachloro bis (isopropylthio) butadiene. | 4.4 moles hydrogen peroxide. | Do. |
| 1 mole 2-(pentachlorobutadienylthio)-ethanol. | 2.2 moles hydrogen peroxide. | Do. |
| 1 mole dichloro-tetrakis (methylthio)-butadiene | 8.0 moles hydrogen peroxide. | 5 liters acetic acid. |
| 1 mole methyl pentachlorobutadienyl sulfide. | 3.0 moles hydrogen peroxide. | 2½ liters acetic acid. |

The compounds of this invention may be employed in a variety of applications, biological or otherwise, but are specifically useful in the field of pesticides being active fungicides, insecticides, nematocides and herbicides. It is significant to know that the sulfone compounds of this invention, i.e., those within the scope of generic structure I above, are active both as contact fungicides, i.e., the fungus is contacted with the fungicide of the present invention and as systemic fungicides, i.e., the soil around the infested plants is contacted with the fungicide thus immunizing the plant against infestation.

It will be understood that such compounds may be used in diverse formulations, both liquid and solid, including finely-divided powders, dust and granular materials, solutions, concentrates, emulsifiable concentrates, slurries and the like, depending upon the application intended and the formulation media desired.

Thus, it will be appreciated that compounds of this invention may be employed to form biologically-active substances containing such compounds as essential active ingredients thereof, which compositions may also include finely-divided dry or liquid carriers, extenders, fillers, conditioners, including various clays, diatomaceous earth, talc, spent catalyst, alumina silica materials and incorporating liquids, solvents, diluents, etc., typically water and various organic liquids such as alcohols, e.g., isopropanol, methanol, hydrocarbons, e.g., benzene, toluene, xylene, chlorinated hydrocarbons, such as tetrachloroethylene, trichlorobenzene and chlorinated xylenes, chloroform, carbon tetrachloride, carbon disulfide and petroleum distillate fractions or mixtures thereof.

When liquid formulations are employed or dry materials prepared which are to be used in liquid form, it is desirable in certain instances to additionally employ a wetting, emulsifying or dispersing agent to facilitate use of the formulation. Suitable surface active agents are set forth, for example, in an article by John W. McCutcheon in "Soap and Chemical Specialities," vol. 31, Nos. 7–10 (1955).

The term "carrier" as employed in the specification and claims is intended to refer broadly to materials constituting a major proportion of a biologically-active or other formulation and hence includes finely-divided materials, both liquids and solids, as aforementioned, conventionally used in such applications.

The compounds of the present invention may be used alone or in combination with other known biologically active or other materials, such as chlorinated hydrocarbons and organic phosphorous pesticides, foliage and soil pesticides and fungicides, pre- and post-emergent herbicides, nematocides, and the like.

In order that those skilled in the art may more completely understand the present invention and the preferred methods by which the same may be carried into effect, the following specific examples are offered:

Example 1
PREPARATION OF 2-(PENTACHLOROBUTADIENYL-THIO)ETHANOL 100 ml. of benzene is heated in a flask equipped with stirrer, thermometer, dropping funnel, and reflux condenser. To this is added 34.3 g. (0.44 mol) of 2-mercapto ethanol followed by the addition of 10.1 g. (0.44 mol) of sodium metal, in small portions with stirring, and then 104.0 g. (0.4 mol) hexachlorobutadiene. The reaction is carried to completion over a period of about 7 hours, i.e., 4 hours at 30° C., followed by heating for 3 hours at 75° C. The resultant crude product comprises compounds having the general formula, $$C_4Cl_m(SC_2H_4OH)_{6-m}$$

wherein $m$ is a number from 0 to 5, inclusive. The 1:1 product, $C_4Cl_5SC_2H_4OH$, is distilled from the crude product at 134 to 138° C. at 0.7 mm. mercury pressure yielding a product which has a refractive index, $n/D$ 25 of 1.5930 and is soluble in water to the extent of less than 5.0 g. per 100 ml., at 25° C., and is more soluble in acetone, cyclohexanone and xylene.

Example 2

In order to demonstrate insecticidal activity, male German cockroaches, *Blattella germanica*, 8 to 9 weeks old, are anaesthetized with carbon dioxide to facilitate handling and then dipped in a test formulation (2000 p.p.m. product of Example 1—5% acetone—0.01% Triton X–155—balance water) for 10 seconds, removed, freed of excess liquid, and caged. Two lots of 10 insects each are exposed to this formulation, and mortality observations are recorded after three days. Using the product of Example 1 at the above concentration, 100% mortality is observed.

Example 3

Insecticidal utility is also shown in the following test. The bean aphid, *Aphis fabae*, is cultured on nasturtium plants. No attempt is made to select insects of a given age in this test. Test pots are prepared by reducing the number of nasturtium plants in 2½ inch culture pots until those remaining are infested with approximately 100 aphids. The infested test plants are treated with a formulation of the test chemical (2000 p.p.m. product of Example 1—5% acetone—0.01% Triton X–155—balance water). Based on counts made 24 hours after exposure, 50% mortality is observed.

Example 4

In order to evaluate fungicidal activity, spore germination tests on glass slides are conducted via the test tube dilution method adopted from the procedure recommended by the American Phytopathological society's committee on standardization of fungicidal tests. In this procedure, the product of Example 1 in aqueous formulations at concentrations of 1000, 100, 10 and 1.0 p.p.m. is tested for its ability to inhibit germination of spores of from 7 to 10-day-old cultures of *Alternaria oleracea* and *Monilina fructicola*. Employing this procedure, the product of Example 1 is effective in the dosage range of 10 to 100 p.p.m. for the *A. oleracea* and 1.0 to 10 p.p.m. for the *M. fructicola*, respectively.

Example 5

The following test measures the ability of the product of Example 1 to protect pea seeds and seedlings from seed decay and damping-off fungi (Pythium and Fusarium). In this test, infested soil in 4 x 4 x 3 inch plant band boxes is treated by a soil drench-mix method at a rate equivalent to 128 lbs./acre. Treatment is accomplished by pouring 70 ml. of a 2000 p.p.m. test formulation (2000 p.p.m. product of Example 1—5% acetone—0.01% Triton X—155—balance water) on the surface of the soil. This is allowed to stand until the next day when the soil is removed from each box and thoroughly mixed before being replaced in the box. Three days after treatment, 25 pea seeds, variety Perfection, are planted at a uniform depth per box. Untreated checks are included in each test in addition to a check planted in sterilized soil. Percentage stand recorded 14 days after planting shows better than 40% stand whereas the untreated checks indicated 0% stand.

Example 6

Further fungicidal activity is tested employing the large seed leaves of 10-day old Pinto bean plants. The product of Example 1 is applied to the soil in a test formulation (2000 p.p.m. product of Example 1—5% acetone—0.01% Triton X–155—balance water). The concentration of test chemical used is equivalent to 128 lbs./acre. Immediately following application of the test chemical to the soil surrounding the plants, the plants are sprayed with a spore suspension of the rust fungus, *Uromyces phaseoli*. This spore suspension is prepared by mixing 30 mg. of freshly harvested spores with 48 mg. of talc. This is then diluted with water at the rate of about 1 mg. of the talc-spore mixture to 1.7 ml. of distilled water.

After spraying the spores on the seed leaves of the bean plants, they are placed in a 100% humid atmosphere for 24 hours at 60° F. After incubation the plants are removed to controlled greenhouse conditions and 9 to 10 days after exposure rust lesions are counted. The data observed is converted to percentage disease control based on the number of lesions obtained on the untreated plants. Using this test the product of Example 1 affords better than 60% disease control.

Example 7

To evaluate bactericidal activity, the product of Example 1 is mixed with distilled water containing 5% acetone and 0.01% Triton X–155, at a concentration of 500 p.p.m. 5 ml. of the test formulation is put into each of four test tubes. To each test tube is added one of the organisms: *Erwenia amylovora*, *Xanthomonas phaseoli*, *Staphylococcus aureus* and *Escherichia coli* in the form of a bacterial suspension in a saline solution from potato-dextrose agar plates. The tubes are then incubated for 4 hours at 30° C. Transfers are then made to sterile broth with a standard 4 mm. loop and the thus-inoculated broth is incubated for 48 hours at 37° C. effectiveness is rated as percent bacteria growth. Using this procedure the product of Example 1 caused bacterial growth ratings of 0, 0, 0 and 30% for the above bacteria in their respective order.

Example 8

Seeds of perennial rye grass and radish are treated in Petri dishes with aqueous suspensions of the test chemical at 1000 and 100 p.p.m. (i.e., 1000 or 100 p.p.m. product of Example 1—5% acetone—0.01% Triton X–155—balance water). Lots of 25 seeds of each type are scattered in separate dishes containing filter paper disc moistened with 5 ml. of the test formulation at each concentration. After 7 to 10 days under controlled conditions the test compound is rated according to the concentration that inhibits germination of at least half of the seeds (ED 50) in the test. Using this test, the product of Example 1 receives ratings of greater than 1000 p.p.m. for the radish and in the range of 10 to 100 p.p.m. for the rye grass, thus demonstrating selective herbicidal activity.

Example 9

To illustrate herbicidal action, tomato plants, variety Bonny Best, 5 to 7 inches tall; corn, variety Cornell M–1 (field corn), 4 to 6 inches tall; bean, variety Tendergreen, just as the trifoliate leaves are beginning to unfold; and oats, variety Clinton, 3 to 5 inches tall, are sprayed with an aqueous test formulation (6400 p.p.m. product of Example 1—5% acetone—0.01% Triton X–155—balance water). The plants are sprayed with 100 ml. at 40 lbs. air pressure while being rotated on a turntable in a spray hood. Records are taken 14 days after treatment and phytotoxicity is rated on a scale from 0 for no injury to 11 for plant kill. Results indicate that the product of Example 1 receives ratings of 11, 11, 11 and 10 for the tomato, bean, corn and oat plants, respectively.

Example 10

In order to make an in vitro evaluation of the product of Example 1 as a contact poison against nematodes, *Panagrellus redivivus* nematodes are exposed to the product of Example 1 in small watch glasses (27 mm. diameter x 8 mm. deep), within a 9 cm. Petri dish. Aqueous test formulations (1000 and 100 p.p.m. product of Example 1—5% acetone—0.01% Triton X–155—balance water) are used. Results recorded 24 hours after treatment show 100% nematode control at both of the above concentrations.

Example 11

PREPARATION OF METHYL PENTACHLOROBUTA-DIENYL SULFIDE 200 ml. of ethanol is cooled to about −5° C. in a flask equipped with thermometer, stirrer, dropping funnel and reflux condenser. 54.2 g. (1.13 mol) of chilled methyl mercaptan is added. A solution of 63.0 g. (1.13 mol) of potassium hydroxide in 400 ml. of 95% alcohol is added dropwise with stirring at a temperature between −6° C. to 2° C. over a period of 1 hour. Upon completing the addition of potassium hydroxide, the cooling bath is removed from around the reaction flask and 147.0 g. (0.565 mol) of hexachlorobutadiene is added over a period of about 40 minutes at reflux temperature, i.e., about 80° C. Stirring at reflux is continued for 9 hours. The reaction mixture is then allowed to cool to room temperature and the crude product is separated. The crude mixture contains methylchlorobutadienyl sulfides having the general formula, $C_4Cl_n(SCH_3)_{6-n}$ with the main product being methyl pentachlorobutadienyl sulfide. The methyl pentachlorobutadienyl sulfide is distilled in the range of 79° C. at 0.5 mm. mercury pressure to 115° C. at 0.8 mm. mercury pressure, this distillate has a refractive index, $n/D$ 25 of 1.550, and is soluble in water to the extent of less than 5.0 g. per 100 ml. at 25° C., and more soluble in acetone, cyclohexanone and xylene.

Example 12

Insecticidal activity is demonstrated employing the evaluation procedure given in Example 2. In this test the product of Example 11 causes greater than 50% insect mortality.

Example 13

Fungicidal activity is demonstrated employing the test procedure given in Example 4 previously. In this test the product of Example 11 is effective in the range of 10 to 100 p.p.m. for *A. Oleracea* and 1.0 to 10 p.p.m. for the *M. fructicola*, respectively.

Example 14

A tomato foliage disease test is conducted measuring the ability of the product of Example 11 to protect tomato foliage against infection by the early blight fungus *Alternaria solani*. Tomato plants 5 to 7 inches high of the variety Bonny Best are employed. The plants are sprayed with 100 ml. of test formulation at 2000 p.p.m. and 400 p.p.m. (2000 and 400 p.p.m. product of Example 11—5% acetone—0.01% Triton X–155—balance water) at 40 lbs. air pressure while being rotated on a turntable in a spray chamber. After the spray deposit is dry, the treated plants and comparable untreated controls are sprayed with a spore suspension containing approximately 20,000 conidia of *A. solani* per ml. The plants are held in a 100% humid atmosphere for 24 hours at 70° F. to permit spore germination and infection. After 2 to 4 days, lesion counts are made on the three uppermost fully expanded leaves. The product of Example 11 in this test causes greater than 30% blight control at a concentration of 2000 p.p.m.

Example 15

Herbicidal activity of the product of Example 11 is demonstrated employing the procedure given in Example 9 previously. In this test the product of Example 11 receives ratings of 1, 1, 11 and 1 for the tomato, bean, corn and oat plants, respectively.

Example 16

Nematocidal activity is demonstrated employing the procedure given in Example 10. In this test, the product of Example 11 causes greater than 95% nematode control at a concentration of 1000 p.p.m.

Example 17

PREPARATION OF DICHLORO-TETRAKIS(METHYLTHIO)-BUTADIENE

The general procedure in the reaction of methyl mercaptan and hexachlorobutadiene previously given in Example 11 is carried out, isolating the desired dichlorotetrakis(methylthio)-butadiene by distillation between 130° at 2.0 mm. mercury pressure and 180° C. at 2.6 mm. mercury pressure. This product has a refractive index, $n/D$ 25 in the range of 1.5–1.63 and is less than 5% soluble in water and greater than 5% soluble in acetone, cyclohexanone and xylene.

Example 18

To illustrate miticidal activity, a test is carried out whereby adult two-spotted spider mites, *Tetranychus bimaculatus*, maintained on Tendergreen beans under controlled conditions are transferred from a stock culture by leaf cuttings to uninfested seed leaves of bean plants in 2½ inch pots the day prior to testing. Formulation of the test chemical (2000 p.p.m. product of Example 17—5% acetone—0.01% Triton X–155—balance water) is sprayed onto the infested test plants. Counts are made after two days showing greater tran 70% insect control.

Example 19

The product of Example 17 demonstrates fungicidal activity employing the test given in Example 14. In this test the product of Example 17 affords 100% blight control at a concentration of 2000 p.p.m.

Example 20

The product of Example 17 demonstrates bactericidal activity employing the procedure given in Example 7. In this test the product of Example 17 affords complete control for the *Erwenia amylovora*, *Xanthomonas phaseoli*, and *Staphylococcus aureus*; however, this test compound affords little bacteria control for the *Escherichia coli* thus demonstrating selective bactericidal activity.

Example 21

Herbicidal activity of the product of Example 17 is demonstrated employing the procedure given in Example 9. In this test, the product of Example 17 receives ratings of 3, 3, 11 and 3 for the tomato, bean, corn and oat plants, respectively.

Example 22

The product of Example 17 affords 100% nematode control at a concentration of 1000 p.p.m. employing the test procedure given in Example 10 previously.

It is to be understood that although the invention has been described with specific reference to particular embodiments thereof, it is not to be so limited since changes and alterations therein may be made which are within the full intended scope of this invention as defined by the appended claims.

What is claimed is:

1. Compounds represented by the structure:

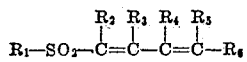

wherein $R_1$ is selected from the group consisting of alkyl and hydroxy alkyl; $R_2$, $R_3$, $R_4$, $R_5$ and $R_6$ are selected from the group consisting of chlorine and alkyl sulfonyl radicals of the structure $R_1-SO_2-$, wherein $R_1$ is as defined above.

2. Compounds represented by the structure:

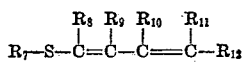

wherein $R_7$ is selected from the group consisting of alkyl and hydroxy alkyl; $R_8$, $R_9$, $R_{10}$, $R_{11}$ and $R_{12}$ are selected from the group consisting of chlorine and alkylthio radicals of the structure $R_7-S-$, wherein $R_7$ is as defined above.

3. Methyl pentachlorobutadienyl sulfide.
4. Dichloro-tetrakis(methylthio)-butadiene.
5. 2-(pentachlorobutadienylthio)-ethanol.
6. Methyl pentachlorobutadienyl sulfone.
7. Dichloro-tetrakis(methylsulfonyl)-butadiene.
8. 2-(pentachlorobutadienylsulfonyl)-ethanol.
9. Tetrachloro-bis(isopropylsulfonyl)-butadiene.
10. Tetrachloro-bis(isopropylthio)-butadiene.
11. The method of preparing compounds according to claim 1 which comprises chemically reacting a compound according to claim 2 with an oxidizing agent selected from the group consisting of hydrogen peroxide, potassium permanganate, potassium dichromate, chromic acid, performic acid, peracetic acid and perbenzoic acid.
12. The method of preparing compounds according to claim 2 which comprises chemically reacting a chlorobutadiene with a mercaptan represented by the structure $R_1-SH$, wherein $R_1$ is selected from the group consisting of alkyl and hydroxy alkyl.
13. The method of preparing 2-(pentachlorobutadienylthio)-ethanol which comprises chemically reacting 2-mercapto ethanol and hexachlorobutadiene in the presence of a basic agent.
14. The method of preparing methyl pentachlorobutadienyl sulfide which comprises chemically reacting methyl mercaptan and hexachlorobutadiene in the presence of a basic agent.
15. The method of preparing dichloro-tetrakis(methylthio)-butadiene which comprises chemically reacting methyl mercaptan and hexachlorobutadiene in the presence of a basic agent.
16. The method of preparing methyl pentachlorobutadienyl sulfone which comprises chemically reacting methyl pentachlorobutadienyl sulfide with an oxidizing agent selected from the group consisting of hydrogen peroxide, potassium permanganate, potassium dichromate, chromic acid, performic acid, peracetic acid and perbenzoic acid.
17. The method of preparing polychloro-poly(methylsulfonyl)-butadiene which comprises chemically reacting a poly-chloro-poly(methylthio)-butadiene with an oxidizing agent selected from the group consisting of hydrogen peroxide, potassium permanganate, potassium dichromate, chromic acid, performic acid, peracetic acid and perbenzoic acid.
18. The method of preparing 2-(pentachlorobutadienylsulfonyl)-ethanol which comprises chemically reacting 2-(pentachlorobutadienylthio)-ethanol with an oxidizing agent selected from the group consisting of hydrogen peroxide, potassium permanganate, potassium dichromate, chromic acid, performic acid, peracetic acid and perbenzoic acid.

References Cited in the file of this patent

UNITED STATES PATENTS

| | | |
|---|---|---|
| 1,986,218 | Remy | Jan. 1, 1935 |
| 2,043,941 | Williams | June 9, 1936 |
| 2,527,948 | Lyon | Oct. 31, 1950 |
| 2,529,355 | Schulze | Nov. 7, 1950 |
| 2,560,421 | Eby | July 10, 1951 |
| 2,676,129 | Bashour | Apr. 20, 1954 |
| 2,829,172 | Lane | Apr. 1, 1958 |